(12) United States Patent
Tsai

(10) Patent No.: US 9,182,225 B2
(45) Date of Patent: Nov. 10, 2015

(54) POSITION RECOGNITION DEVICE OF PRINTER

(71) Applicant: ShenZhen Goldsun Network Intelliency Technology Co., Ltd., ShenZhen (CN)

(72) Inventor: Ping-Fang Tsai, New Taipei (TW)

(73) Assignee: ShenZhen Goldsun Network Intelliency Technology Co., Ltd., ShenZhen (CN)

( * ) Notice: Subject to any disclaimer, the term of this patent is extended or adjusted under 35 U.S.C. 154(b) by 398 days.

(21) Appl. No.: 13/851,699

(22) Filed: Mar. 27, 2013

(65) Prior Publication Data

US 2013/0326889 A1 Dec. 12, 2013

(30) Foreign Application Priority Data

Jun. 8, 2012 (TW) .............................. 101120823 A

(51) Int. Cl.
| | |
|---|---|
| *G01B 21/16* | (2006.01) |
| *B41J 19/20* | (2006.01) |
| *B41J 11/36* | (2006.01) |
| *B41F 33/16* | (2006.01) |

(52) U.S. Cl.
CPC .............. *G01B 21/16* (2013.01); *B41J 19/205* (2013.01); *B41F 33/16* (2013.01); *B41J 11/36* (2013.01); *B65H 2403/40* (2013.01); *B65H 2403/43* (2013.01); *B65H 2404/16* (2013.01)

(58) Field of Classification Search
CPC ........ G01B 21/16; B41J 19/205; B41J 11/36; B41F 33/16; B65H 2403/40; B65H 2403/43; B65H 2404/16
USPC .......................... 33/1 PT, 1 N, 534, 501.7, 600
See application file for complete search history.

(56) References Cited

U.S. PATENT DOCUMENTS

| | | | | |
|---|---|---|---|---|
| 5,930,905 | A * | 8/1999 | Zabler et al. .................. | 33/1 PT |
| 6,341,426 | B1 * | 1/2002 | Okumura ...................... | 33/1 PT |
| 6,804,888 | B2 * | 10/2004 | Nishikawa et al. ........... | 33/1 PT |
| 8,123,210 | B1 * | 2/2012 | Murray ......................... | 271/4.04 |
| 2003/0177649 | A1 * | 9/2003 | Ito et al. ........................ | 33/1 PT |
| 2004/0139619 | A1 * | 7/2004 | Tateishi et al. ................ | 33/1 PT |
| 2013/0026704 | A1 * | 1/2013 | Wu ................................ | 271/225 |
| 2015/0061219 | A1 * | 3/2015 | Murakami et al. ............ | 271/272 |

* cited by examiner

*Primary Examiner* — R. A. Smith
*Assistant Examiner* — Tania Courson
(74) *Attorney, Agent, or Firm* — Novak Druce Connolly Bove + Quigg LLP

(57) ABSTRACT

A position recognition device of a printer includes a bracket, a platform, a positioning gear, and a base. The bracket includes a receiving shaft. The receiving shaft includes a shaft body and a gear portion mounted to the shaft body. The positioning gear is pivotally located to the platform. The positioning gear includes a gear body and a marker connected to the gear body. The gear body and the gear portion are the same size. The base is slidably mounted to the bracket. The base includes a sensor. The positioning gear is located under the sensor to be aligned with the sensor; the gear portion rotates to drive the positioning gear to rotate. The sensor senses the marker to determine an initial position of the receiving shaft for compensation.

19 Claims, 4 Drawing Sheets

POSITION RECOGNITION DEVICE OF PRINTER

BACKGROUND

1. Technical Field

The present disclosure relates to printers, more particularly to a position recognition device of a printer.

2. Description of Related Art

A printer needs a diametrical compensation for a receiving shaft of the printer which receives paper. The printer includes a recognition wheel for determining an initial position of the receiving shaft. However, the printer also needs a sensor to recognize the initial position, which increases the cost of the printer.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
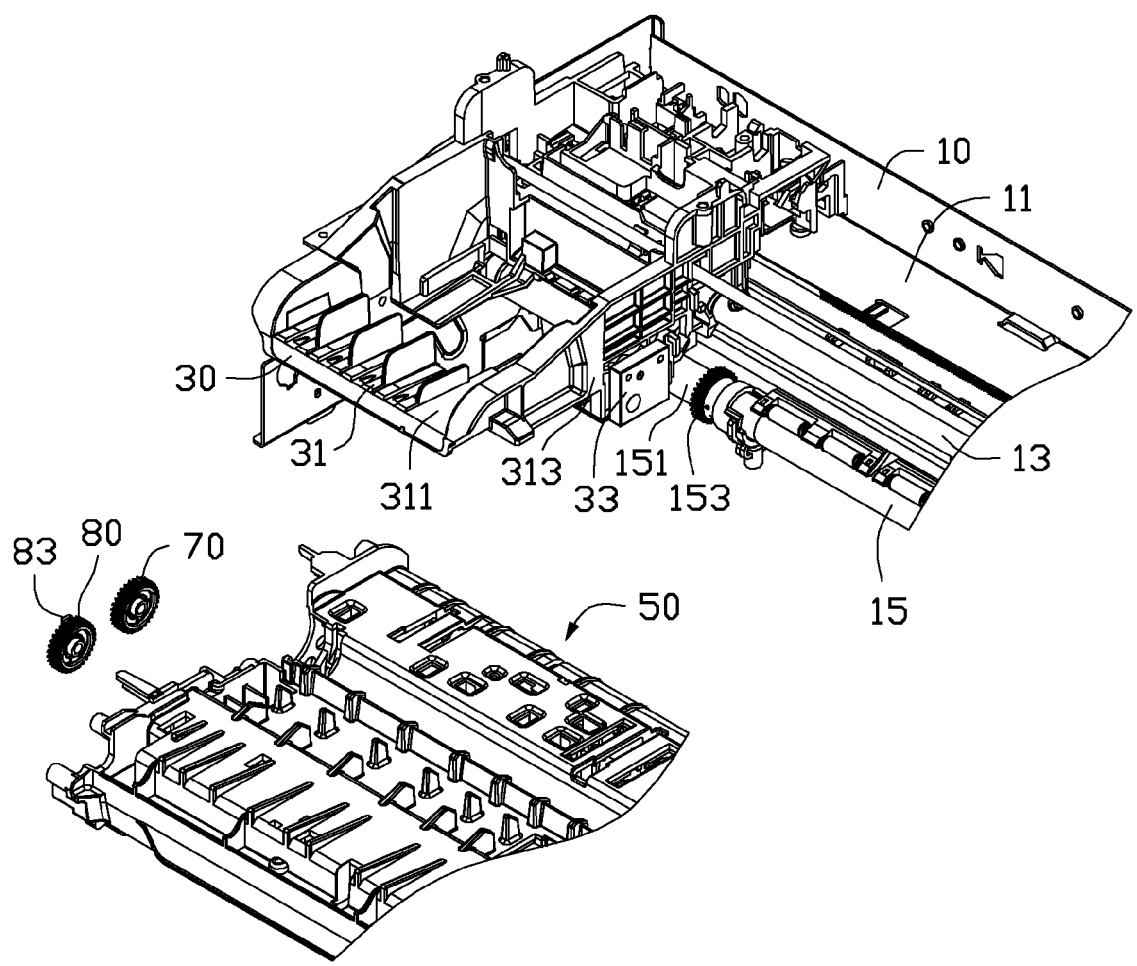
FIG. 1 is an exploded, isometric view of a position recognition device of a printer in accordance with one embodiment of the present disclosure.
Figure 2:
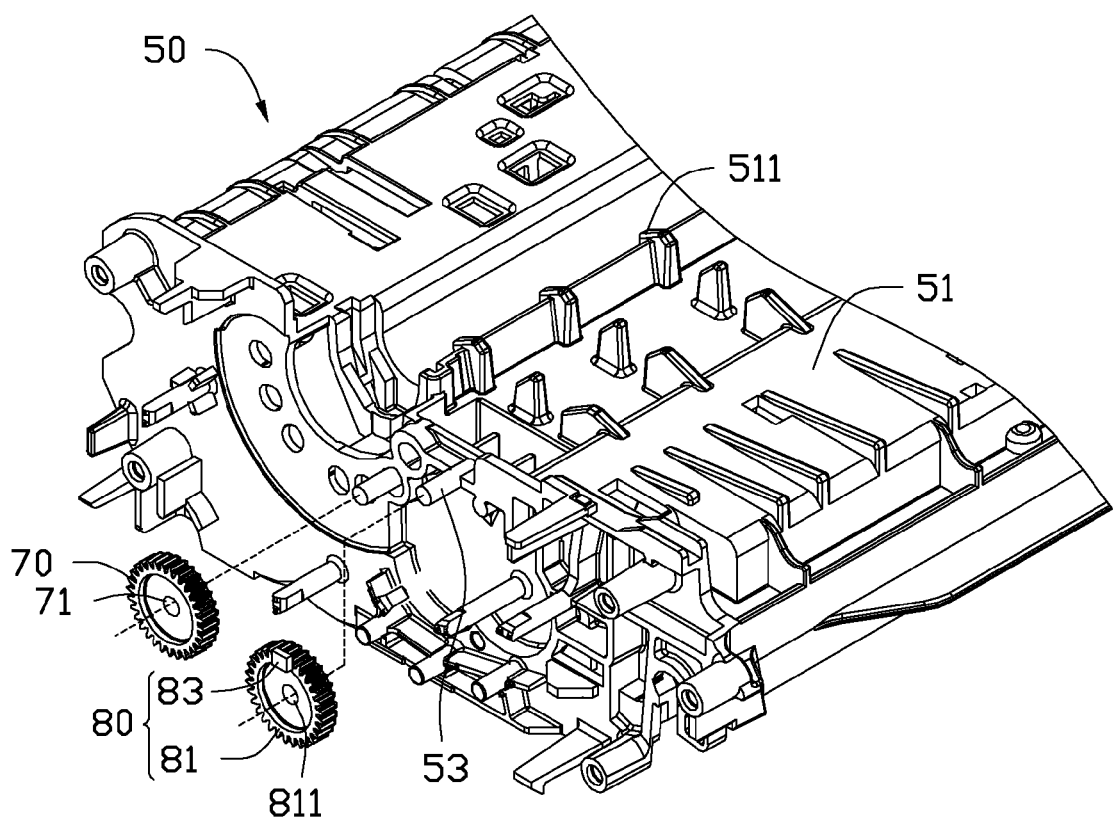
FIG. 2 is an exploded, isometric view of an idler wheel, a positioning gear, and a platform of FIG. 1.

FIGS. 1 and 2 show a position recognition device of a printer in accordance with one embodiment. The printer includes a bracket 10, a base 30, a platform 50.

The bracket 10 includes a bottom wall 11, a sliding shaft 13 mounted on the bottom wall 11, and a receiving shaft 15 pivotally mounted on the bottom wall 11. The sliding shaft 13 is substantially parallel to the receiving shaft 15 and the bottom wall 11. The receiving shaft 15 includes a shaft body 151 and a gear portion 153 mounted to the shaft body 151. The shaft body 151 is driven to rotate by a motor (not shown).

The base 30 includes a base body 31 and a sensor 33. The base body 31 includes a bottom panel 311 and two side panels 313 extending from the bottom panel 311. The two side panels 313 are substantially perpendicular to the bottom panel 311. The sensor 33 is mounted to one of the side panels 313. The base body 31 includes an ink gun (not shown). The base 30 is slidably mounted to the sliding shaft 13.

Figure 3:
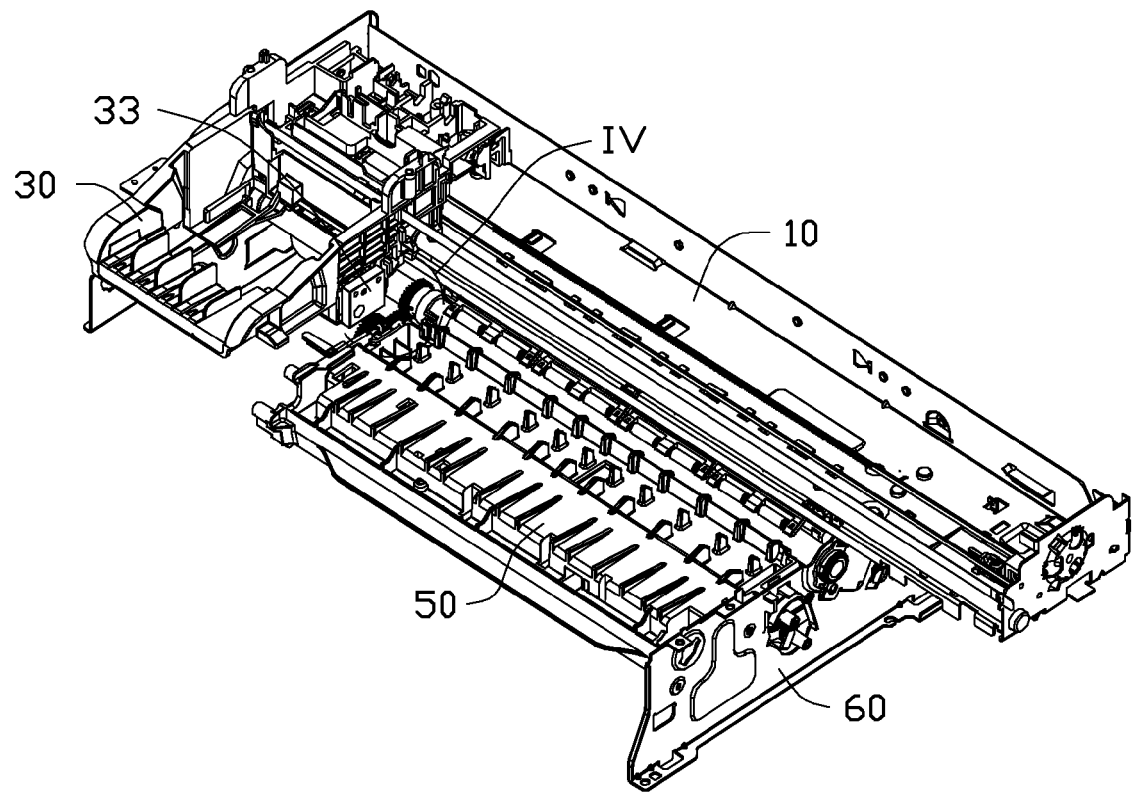
FIG. 3 is an assembled view of the eccentric wheel of FIG. 1.
Figure 4:
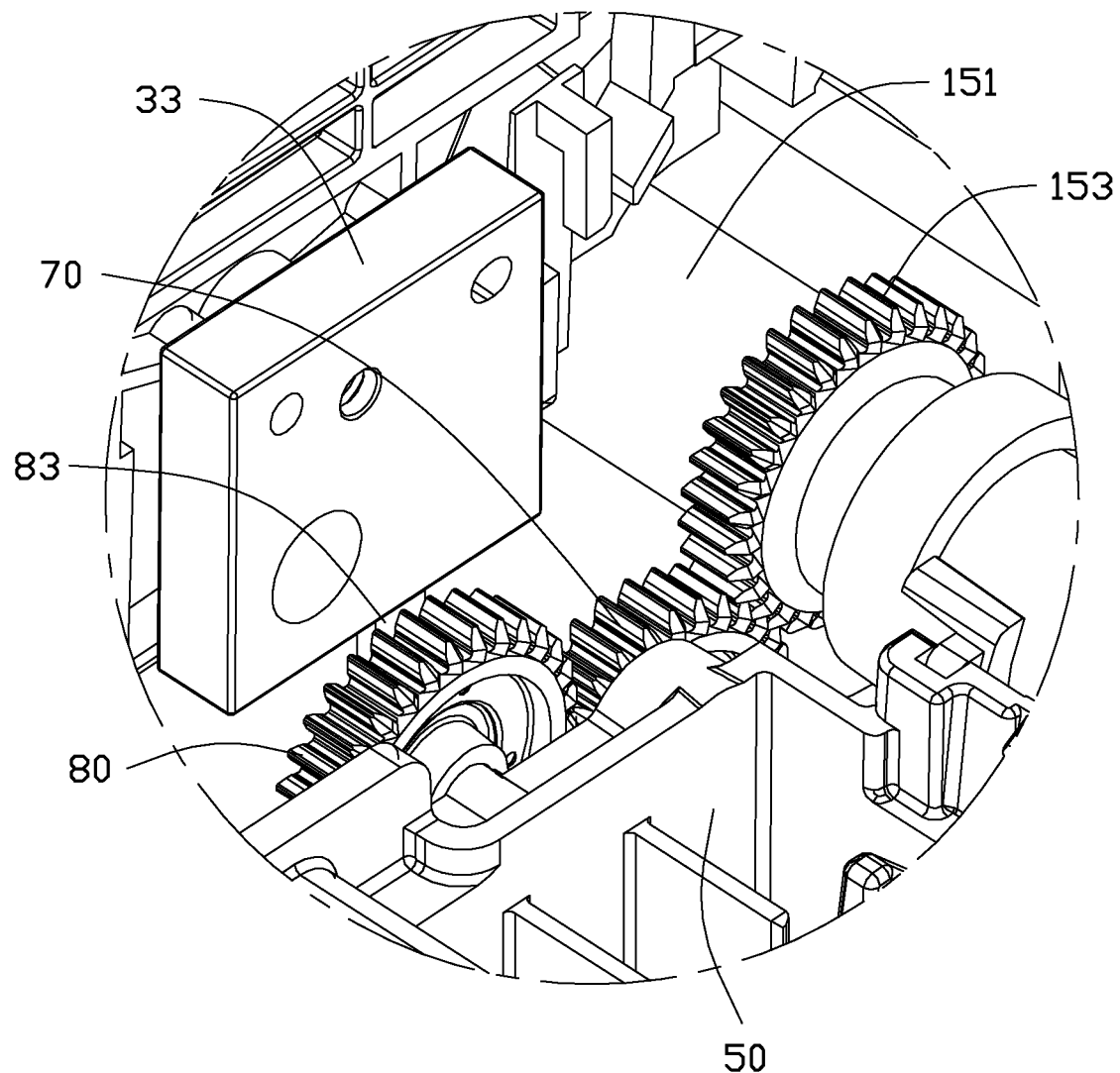
FIG. 4 is a partial and enlarged view of FIG. 3.

FIGS. 2 and 3 show that the platform 50 includes a platform body 51 and two axis bodies 53 extending from one side of the platform body 51. Another side of the platform body 51 is secured to a mounting panel 60. The mounting panel 60 is secured on the bottom wall 11. The mounting panel 60 is substantially perpendicular to the bottom wall 11. The platform body 51 defines recess portion 511 for receiving the receiving shaft 15.

An idler wheel 70 and a positioning gear 80 are pivotally mounted to the two axis bodies 53. The idler wheel 70 defines a pivot hole 71 corresponding to the axis body 53. The positioning gear 80 includes a gear body 81 and a marker. In one embodiment, the marker is a positioning protrusion 83 extending from the gear body 81. The positioning protrusion 83 is cuboid-shaped. The gear body 81 defines a rotating hole 811 corresponding to the axis body 53. The gear body 81 and the gear portion 153 are the same size with the same teeth. The idler wheel 70 and the gear body 81 are the same size. The positioning gear 80 is located under the sensor 33 to be aligned with the sensor 33. The sensor 33 is configured to the position of the positioning protrusion 83 to determine the initial position of the receiving shaft 15.

FIGS. 1 to 4 show that in assembly, the platform 50 is mounted to the mounting panel 60. The recess portion 511 of the platform 50 receives the receiving shaft 15. The axis bodies 53 are respectively received in the pivot hole 71 of the idler wheel 70 and the rotating hole 811 of the positioning gear 80. The positioning gear 80 engages the idler wheel 70, and the idler wheel 70 engages the gear portion 153 of the receiving shaft 15.

The receiving shaft 15 rotates to drive the positioning gear 80 to rotate in the same direction. When the sensor 33 recognizes the positioning protrusion 83, the position of the receiving shaft 15 is an initial position for compensation.

In one embodiment, there are a plurality of idler wheels 70 engage between the positioning gear 80 and the gear portion 153.

In one embodiment, the positioning gear 80 engages the gear portion 153 of the receiving shaft 15 directly.

It is to be understood, however, that even though numerous characteristics and advantages of the embodiments have been set forth in the foregoing description, together with details of the structure and functions of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A position recognition device of a printer, comprising:
    a bracket, the bracket comprises a bottom wall and a receiving shaft pivotally located on the bottom wall; the receiving shaft comprises a shaft body and a gear portion mounted to the shaft body;
    a positioning gear, the positioning gear comprises a gear body and a marker connected to the gear body; the gear body are the same size with the gear portion; and
    a base, the base is mounted to the bracket; the base comprises a sensor corresponding to the positioning gear;
    wherein the gear portion is configured to rotate to drive the positioning gear to rotate, and the sensor is configured to sense the marker to determine an initial position of the receiving shaft for compensation.

2. The position recognition device of claim 1, further comprising an idler wheel, wherein the idler wheel engages the positioning gear and the gear portion, and the gear portion is configured to rotate to drive the idler wheel to rotate further to drive the positioning gear to rotate.

3. The position recognition device of claim 2, further comprising a platform, wherein the platform comprises a platform body and two axis bodies extending from the platform body; the idler wheel defines a pivot hole to receive one of the two axis bodies; and the gear body defines a rotating hole to receive the other one of the two axis bodies.

4. The position recognition device of claim 3, further comprising a mounting panel, wherein the mounting panel is secured on the bottom wall; the platform is secured to the mounting panel; and the mounting panel is substantially perpendicular to the bottom wall.

5. The position recognition device of claim 3, wherein the platform body defines a recess portion receiving the receiving shaft.

6. The position recognition device of claim 2, wherein the idler wheel and the gear body are the same size.

7. The position recognition device of claim 1, wherein the positioning gear is located under the sensor to be aligned with the sensor.

8. The position recognition device of claim 1, wherein the marker is a positioning protrusion extending from the gear body.

9. The position recognition device of claim 1, wherein the shaft body is substantially parallel to the bottom wall.

10. The position recognition device of claim 1, wherein the bracket further comprises a sliding shaft substantially parallel to the bottom wall, and the base is slidably mounted to the sliding shaft.

11. A position recognition device of a printer, comprising:
a bracket, the bracket comprises a receiving shaft; the receiving shaft comprises a shaft body and a gear portion mounted to the shaft body;
a platform;
a positioning gear pivotally located to the platform, the positioning gear comprises a gear body and a marker connected to the gear body; the gear body and the gear portion are the same size; and
a base, the base is slidably mounted to the bracket; the base comprises a sensor;
wherein the positioning gear is located under the sensor to be aligned with the sensor; the gear portion is configured to rotate to drive the positioning gear to rotate; and the sensor is configured to sense the marker to determine an initial position of the receiving shaft for compensation.

12. The position recognition device of claim 11, further comprising an idler wheel pivotally mounted to the platform, wherein the idler wheel engages the positioning gear and the gear portion, and the gear portion is configured to rotate to drive the idler wheel to rotate further to drive the positioning gear to rotate.

13. The position recognition device of claim 12, wherein the platform comprises a platform body and two axis bodies extending from the platform body; the idler wheel defines a pivot hole to receive one of the two axis bodies; and the gear body defines a rotating hole to receive the other one of the two axis bodies.

14. The position recognition device of claim 13, wherein the platform body defines a recess portion receiving the receiving shaft.

15. The position recognition device of claim 13, further comprising a mounting panel, wherein the bracket further comprises a bottom wall; the receiving shaft is pivotally mounted on the bottom wall; the mounting panel is secured on the bottom wall; the platform is secured to the mounting panel; and the mounting panel is substantially perpendicular to the bottom wall.

16. The position recognition device of claim 15, wherein the shaft body is substantially parallel to the bottom wall.

17. The position recognition device of claim 15, wherein the bracket further comprises a sliding shaft substantially parallel to the bottom wall, and the base is slidably mounted to the sliding shaft.

18. The position recognition device of claim 12, wherein the idler wheel and the gear body are the same size.

19. The position recognition device of claim 11, wherein the marker is a positioning protrusion extending from the gear body.

* * * * *